(12) United States Patent
Blair

(10) Patent No.: US 9,074,874 B2
(45) Date of Patent: Jul. 7, 2015

(54) COATING DETECTION ON TRANSPARENT SHEET MATERIAL

(75) Inventor: Alan Blair, St. Paul, MN (US)

(73) Assignee: LiteSentry Corporation, Northfield, MN (US)

( * ) Notice: Subject to any disclaimer, the term of this patent is extended or adjusted under 35 U.S.C. 154(b) by 707 days.

(21) Appl. No.: 13/403,988

(22) Filed: Feb. 24, 2012

(65) Prior Publication Data

US 2013/0220007 A1    Aug. 29, 2013

(51) Int. Cl.
  *G01B 11/28* (2006.01)
  *G01B 11/06* (2006.01)
  *G01B 11/14* (2006.01)

(52) U.S. Cl.
  CPC ............ *G01B 11/0625* (2013.01); *G01B 11/14* (2013.01)

(58) Field of Classification Search
  CPC .. G01N 21/636; G01N 21/64; G01N 21/0303
  USPC ......... 356/614, 239.1, 630, 237.1–237.5, 632
  See application file for complete search history.

(56) References Cited

U.S. PATENT DOCUMENTS 5,991,018 A * 11/1999 Imaizumi et al. .......... 356/239.1
6,683,695 B1 * 1/2004 Simpson et al. ............ 356/632

* cited by examiner

*Primary Examiner* — Tarifur Chowdhury
*Assistant Examiner* — Iyabo S Alli
(74) *Attorney, Agent, or Firm* — Edward Weck

(57) ABSTRACT

A method and device are provided for detecting and determining a type of a coating on either surface of a transparent sheet, measuring a thickness of the transparent sheet and measuring a spacing between at least two transparent sheets. The method and device include at least three discrete light sources, a 2D image generating device, a lens, and a processor. A reflected image area from the surfaces of the transparent sheet from each of the at least three discrete light sources produces a sparse spectrometer profile used to detect the coating and to determine the type of coating on either surface of the transparent sheet. A distance between the reflected image position from the at least three discrete light sources from both surfaces of the transparent sheet is used to calculate the thickness of the transparent sheet and the spacing between at least two transparent sheets.

20 Claims, 8 Drawing Sheets

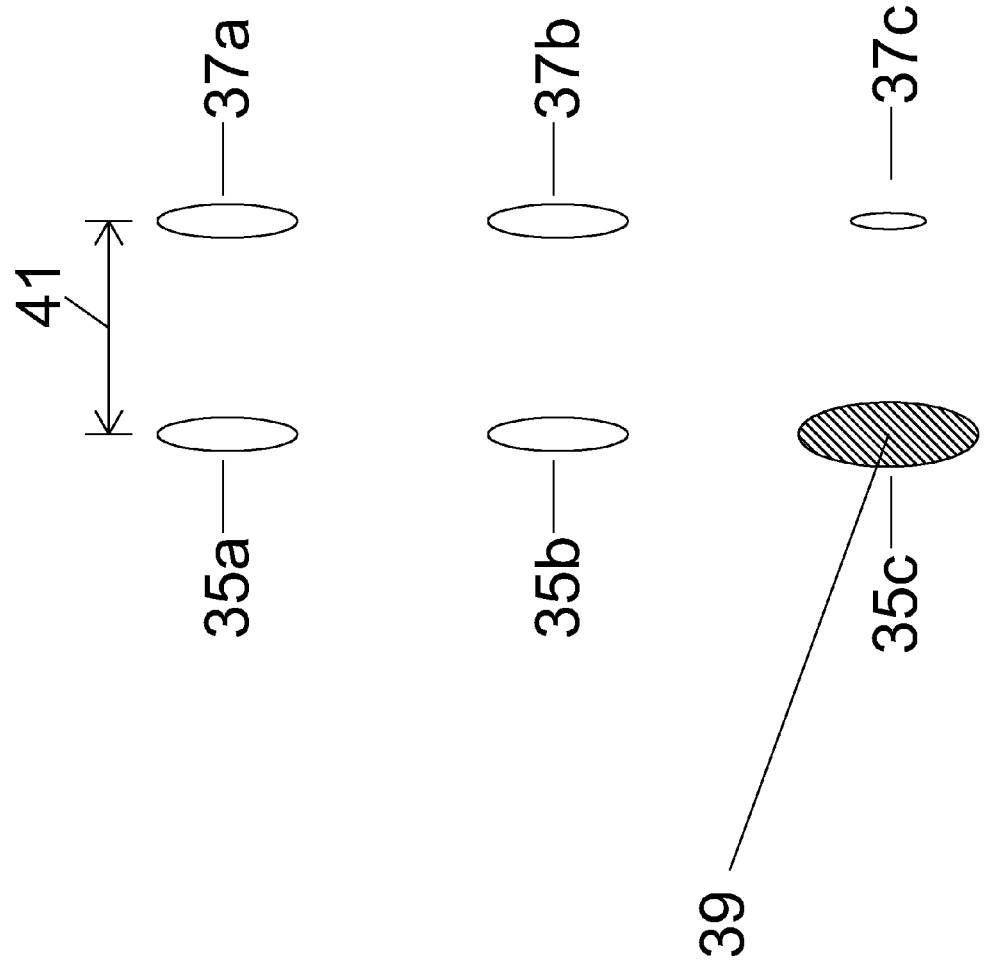

COATING DETECTION ON TRANSPARENT SHEET MATERIAL

BACKGROUND OF THE INVENTION

1. Field of the Invention

The present invention relates to a method and device for detecting the presence and type of coating on the surfaces of transparent sheet material, and measuring the thickness of transparent sheet material using optical techniques without contacting the transparent sheet material.

2. Description of the Related Art

Transparent sheet materials include glass and plastics and are used for the manufacture of windows, photovoltaic solar panels, displays and a variety of other products. The clear sheet material is often modified by adding color to the raw material or by applying coatings to one or more surfaces of the sheet material. The sheet material is modified to change the material properties for a variety of reasons including architectural appearance, solar control properties, electrical properties, mechanical properties, photochromic properties, electrochromic properties, and others property changes. The final transparency of the sheet material after modification ranges from less than 10 percent to greater than 99 percent of visible light. Many coatings are applied to provide properties relating to wavelengths outside the visible spectrum such as low emissivity coatings which reflect large amounts of the infrared spectrum and thereby provide solar control properties.

The thickness of and presence of coatings on the sheet material are measured at points during manufacture of the sheet material and during secondary fabrication of sheet material into end products such as windows, photovoltaic panels or displays. As the material is cut, coated, tempered, laminated, and fabricated in various other processes into windows or other final products, the manufacturer must determine thickness and the presence of coatings to assure proper assembly of the desired final product. Such measurements are often made by humans, are slow to measure, are difficult to perform accurately, and may involve physical contact of an instrument to the sheet material. Human measurement is slow and highly variable. Physical contact of an instrument to the sheet material may cause damage to the material or to coatings on the sheet material. Separate devices are typically required for thickness and coating determination, and more than one device may be required to determine the side of the sheet on which the coating is present.

Of particular interest is the detection of various low emissivity (lowE) coatings broadly used on windows. LowE coatings control the solar spectrum by selectively reflecting the high heat-carrying portion of the infrared (IR) spectrum. Such coatings reflect the IR light back into the building in high latitude climates, and similarly reflect IR light away from the building in low latitude climates. There are a wide variety of coatings used in industry and many are very similar. These coatings have complex reflection profiles which are often non-monotonic. The complex reflection profile can be used to discern the closely related coatings if a high quality measurement of the reflection profile can be obtained.

Prior art methods for measurement of coatings range from the simple to complex. Simple techniques include the emission of light of a single IR wavelength, such as 905 nm. The IR light is reflected from the coating on the sheet and is detected by an IR receiver. This technique has been successfully implemented by LiteSentry Corporation of Minnesota USA since 2000 with the V1 Thickness and Coating sensor. This technique is limited by the reflectivity of the coatings to a single wavelength of light and in its inability to discern between multiple coatings exhibiting varying reflection at the wavelength chosen.

Another simple technique for detecting coatings is disclosed in U.S. Pat. No. 7,652,760 which describes a conductivity sensor for detecting the presence of certain coatings. This technique is limited by the requirement for conductivity of the coating and in its ability to discern between multiple coatings exhibiting varying conductivity.

A complex technique for the measurement of coatings is a spectrometer. A spectrometer measures the optical response of a sheet material and of the coatings on the sheet material by measuring the transmission and reflection of light over a broad spectrum, typically 500 to 1,500 nm range at high resolution, often 1 nm or better. Spectrometers are broadly used to develop and control the application of thin film coatings on sheet material because of their ability to measure the entire reflection profile of a coating to high resolution and accuracy. A spectrometer offers high resolution and accuracy, but is slow and costly and is therefore not appropriate for coating detection in a sheet fabrication process.

Several prior art sources use triangulation of a laser reflection from the surfaces of the sheet material to measure thickness. ISRA of Germany (WO 2005/085751), Keyence of Japan, EDTM of Ohio USA (U.S. Pat. No. 6,683,695) and other companies offer similar devices for measurement of transparent sheet materials using triangulation techniques. Some of the prior art is also capable of discerning coating, but the methods proposed typically use a linear sensor without a lens or imaging element because this makes triangulation a linear relationship. Because these systems do not use a lens or focusing element, they are limited to using one-dimensional (1D) linear sensing arrays as these are the only sensing elements readily available which are large enough to measure a sufficient distance range to be useful for transparent sheet material. Also, because they do not use a lens or focusing element, the light source used must be highly collimated so the reflections from multiple surfaces do not merge. The use of a 1D linear array requires that multiple light sources be very close together making the design of the source complicated and expensive. Also, with the 1D array the light sources must be turned on sequentially or the light from each source would merge, making the measurement slower and less accurate.

SUMMARY OF THE INVENTION

The device and method of the present invention provides for detecting a coating on a first surface or a second surface of a transparent sheet, measuring a thickness of the transparent sheet and measuring a spacing between at least two transparent sheets combines the use of triangulation with a very coarse spectrometer to provide coating and thickness from the same device. This device also makes such measurements on a moving transparent sheet in an industrial production environment without physical contact with either surface of the sheet. Light is provided by multiple light emitting diodes (LED) of multiple wavelengths, reflected off the surfaces of the glass and reflections are imaged by a two-dimensional (2D) CMOS image generating device. The reflected images from multiple LEDs off of multiple glass surfaces are measured simultaneously using the 2D image generating device. The use of a monochrome 2D image generating device and ultraviolet light, visible light and infrared light from LEDs allows simultaneous measurement of sheet thickness, coating presence, coating type and coating location.

In order to achieve and maintain superior quality glass, the manufacturing process includes measurements of individual glass samples from the total number of sheets produced and subsequent manual adjustments to the process to correct problems and maintain satisfactory quality. Samples are typically measured at a frequency of one per hour or less. Manual inspection is done by human and hand tools which contact the material and risk damage to the material and coatings. The low frequency of sampling and slow rate of inspection may result in large quantities of production between sample measurements. This low frequency of sampling can result in large quantities of material produced incorrectly or of inferior quality.

The device and method of the present invention provides for in situ detection of and differentiation between many coatings, determining the surface to which coatings are applied, and measuring thickness of a transparent sheet, while the sheet moves on a production line and without contacting the sheet. The device and method according to this invention may be used to detect the presence of light reflective coatings, light absorbing coatings, optical coatings, high emissivity coatings and low emissivity coatings, as well as other coatings.

The device and method according to this invention may be used to inspect optically transparent sheets of various kinds including glass, coated glass, mirrored glass, acrylic, polycarbonate, and other optically transparent or transmissive polymer sheets. Other optically transparent or optically transmissive (high transmission) polymer sheets include, and are not limited to, polypropylene and polyethylene.

The device and method according to this invention may analyze glass while being moved on a conveyance system in a production process. The conveyance system may employ a belt or rollers or donuts for moving the transparent sheets. The conveyance system may employ an air float system to move the transparent sheets. The conveyance system may be operable at speeds up to 2 msec or higher. The conveyance system may transport glass of widths up to 4 m in width, and from 0.5 mm to 19 mm in thickness. Window-sized pieces of glass may be generally 1 to 2 square meters in size and be transported by the conveyance system.

The device may use LEDs with wavelengths of 405 nm (near UV), 505 nm (blue), 590 nm (green), 630 nm (red), 850 nm and 1050 nm (near IR).

The device may use a 2D image generating device (sensor), such as those provided by Aptina or OmniVision, which allows simultaneous capture of the multiple triangulation paths at relatively high speeds (30 frames per second or greater) while simultaneously performing as a sparse wavelength spectrometer. Alternatively, the device may use an infrared sensitive 2D image generating device such as an InGaAs sensor and infrared LEDs.

2D CMOS image generating devices have become ubiquitous in cell phones and other portable consumer devices. Using a 2D CMOS image generating device in this application along with LED light sources allows the device to leverage the low cost and high capabilities of these devices. One of the beneficial capabilities of these 2D CMOS sensors is the ability to automatically adjust the image brightness either by adjusting the exposure time or sensor gain electronically. This can be used to compensate for background lighting conditions so as not to require any special filtering of the reflected light. Some of the 2D CMOS sensors also include the ability to compensate for sensor to sensor variation, and to automatically correct for lens distortion. A drawback of using these small 2D CMOS sensors is that because of their small size they require a lens to focus light from the desired measurement volume onto the sensor. Using a lens results in parallax (the apparent change in size and position of an object with distance) and lens distortion which must be accounted for to obtain an accurate measurement of thickness or coating. The sensor may send the measured values to an output such as a display or to other communications interfaces such as Ethernet, USB, serial, wireless, etc.

An alternative configuration would be to use a broad spectrum light source with a linear color filter placed in front of it to create a multi-wavelength light source. The linear color filter passes different wavelengths depending on the position of the filter. A second alternative would use a broad spectrum light source with discrete filters in front of it to produce the multi-wavelength light source. A third alternative configuration would be to use a broad spectrum source with multiple apertures as the light source and a color 2D image sensor. The color filter built into the 2D image sensor would serve as the sparse wavelength spectrometer. A fourth alternative would use a broad spectrum light source with a dispersive element such as a grating to generate a multi-wavelength source.

Improved monitoring of the glass fabrication process leads to decreased scrap of defective product, decreased labor requirements to control the process, increased ability to meet established quality levels, decreased use of energy and raw material inputs due to improved yield and therefore decreased cost of production.

Advantages offered by the present invention include: detection of coatings not visible to the human eye; rapid and accurate detection of coatings and measurement of thickness while not contacting the transparent sheet; identification of the surface upon which coatings are present; rapid identification of a defective transparent sheet or an incorrectly oriented, transparent sheet; and a decrease in labor, energy and material costs due to increased yield and decreased scrap from the process.

All patents cited herein are hereby incorporated by reference in their entirety to the same extent as if each individual patent was specifically and individually indicated to be incorporated by reference.

Other features and advantages of the invention will become apparent from the following detailed description, and from the claims.

BRIEF DESCRIPTION OF THE DRAWINGS

All Figures are illustrated for ease of explanation of the basic teachings of the present invention only; the extensions of the Figures with respect to number, position, relationship and dimensions of the sheets to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

FIG. 2 of the drawings shows the reflected images of three LEDs from each of two sides of a transparent sheet as detected by the image generating device.

DETAILED DESCRIPTION OF THE INVENTION

Figure 1:
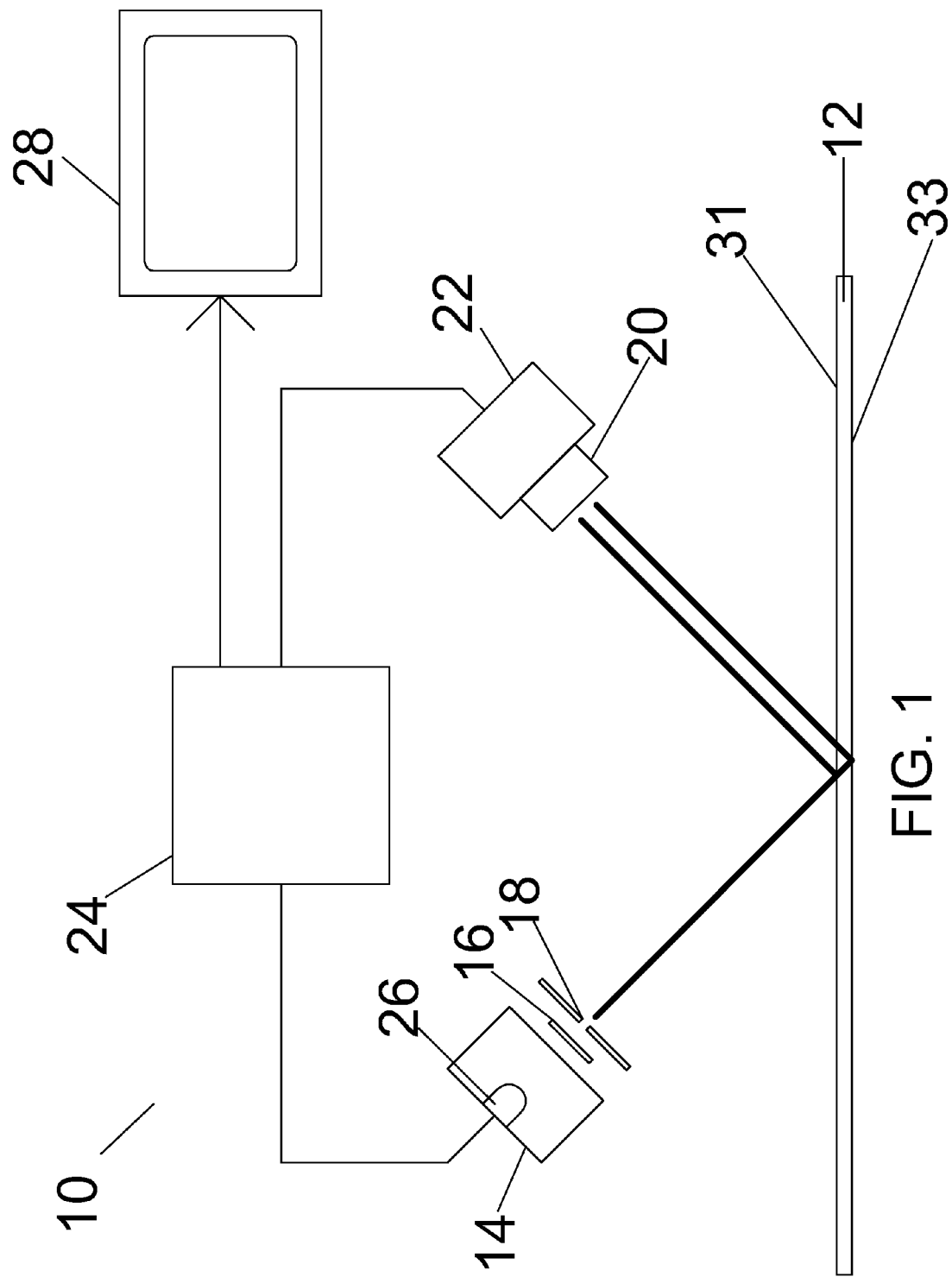
FIG. 1 of the drawings shows a functional diagram of the components in the geometry intended for the device.

The Figures generally illustrate exemplary embodiments of a device 10 for detecting a coating on a first surface 31 or a second surface 33 of a transparent sheet 12, measuring a thickness of the transparent sheet 12 and measuring a spacing between at least two transparent sheets 12. The particular embodiments of this device 10 illustrated in the figures have been chosen for ease of explanation and understanding of various aspects of the present inventions. These illustrated embodiments are not meant to limit the scope of coverage but instead to assist in understanding the context of the language used in this specification and the appended claims.

As illustrated throughout the Figures, the device 10 is for detecting a coating on a first surface 31 or a second surface 33 of a transparent sheet 12, measuring a thickness of the transparent sheet 12 and/or measuring a spacing between at least two transparent sheets 12 and generally includes at least three discrete light sources 14, each having a different narrow band emission; a 2D image generating device 22, producing an output, with the at least three discrete light sources 14 and the 2D image generating device 22 disposed at an angle to each other and on a same side of the transparent sheet 12, such that light projected from the at least three discrete light sources 14 is reflected from the first surface 31 and the second surface 33 of the transparent sheet 12 and collected by the 2D image generating device 22; a lens 20 between the first surface 31 of the transparent sheet 12 and the 2D image generating device 22, with the lens 20 focusing light reflected from the first surface 31 and the second surface 33 of the transparent sheet 12 from the at least three discrete light sources 14 onto the 2D image generating device 22, and; a processor 24; wherein the processor 24 processes the output from the 2D image generating device 22 to define a reflected image area 39 and a reflected image position 41 (FIG. 2) from the first surface and the second surface of the transparent sheet 12 from the at least three discrete light sources 14, with the reflected image area 39 from the first surface 31 and the second surface 33 of the transparent sheet 12 from each the at least three discrete light sources 14 comprising a sparse spectrometer profile used to detect the coating and to determine the type of coating, on either the first surface 31 or the second surface 33 of the transparent sheet 12, and with a distance between the reflected image position 41 from the at least three discrete light sources 14 from the first surface 35 and the second surface 37 of the transparent sheet 12 used to calculate the thickness of the transparent sheet 12 and the spacing between the at least two transparent sheets 12.

The device 10, see FIG. 1, further includes a slit aperture 18 between the at least three discrete light sources 14 and the first surface 31 of the transparent sheet 12, with the slit aperture 12 limiting the apparent size of the at least three discrete light sources 14. The device 10, see FIG. 1, further includes a diffuser 16 between the at least three discrete light sources 14 and the slit aperture 18, with the diffuser 16 scattering light and eliminating structure from the light projected from the at least three discrete light sources 14.

The device 10 further includes LEDs as the at least three discrete light sources 14.

The device 10 where the at least three discrete light sources 14 may be at least four, five, six, seven, eight, nine, ten or twenty discrete light sources 14.

The device 10 wherein an exposure time and an electronic gain of the image generating device 22 are adjustable and there is no filter between the transparent sheet 12 and the image generating device 22.

Figure 6:
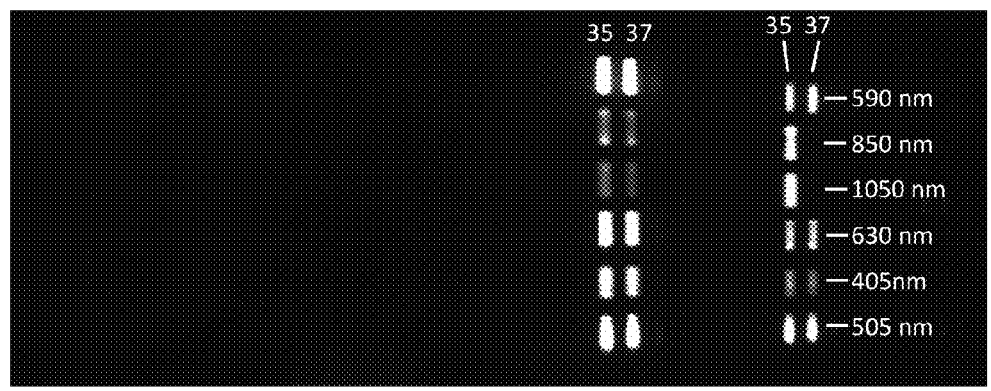
FIG. 6 of the drawings shows the reflected images of six LEDs from four sides of two transparent sheets comprising an insulated glass window.
Figure 7:
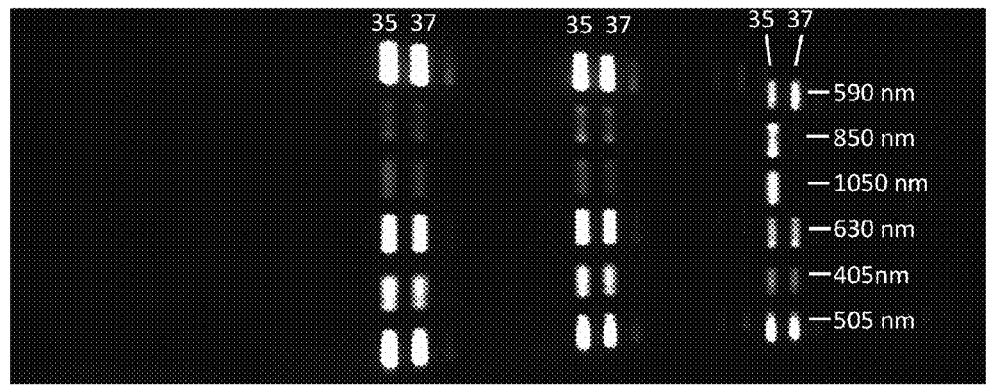
FIG. 7 of the drawings shows the reflected images of six LEDs from six sides of three transparent sheets comprising an insulated glass window.

The device 10 wherein the at least two transparent sheets 12 is at least three transparent sheets 12 (FIGS. 3, 6, 7).

The device 10 wherein the at least three light sources 14 have wavelengths from 350 nm to 1050 nm, covering the range from ultraviolet to infrared (FIGS. 3, 5, 6 and 7).

The device 10 wherein the reflected image area 39 from the at least three discrete light sources 14 from the first surface 35 and the second surface 37 for a transparent sheet 12 without a reflective coating are normalized to the reflected image area 39 from one of the at least three discrete light sources 14 from the first surface 35 and the second surface 37 for the transparent sheet (FIG. 2) without a reflective coating, wherein an output power of the at least three discrete light sources 14 is not calibrated and wherein a sensitivity of the 2D image generating device 22 is not calibrated.

The device 10 for detecting a coating on a first surface 31 or a second surface 33 of a transparent sheet 12 generally includes: at least six discrete light sources 14, each having a different narrow band emission; a 2D image generating device 22, producing an output, with the at least six discrete light sources 14 disposed at an angle to the 2D image generating device 22 and on a same side of the transparent sheet 12, such that light projected from the at least six discrete light sources 14 is reflected from the first surface 35 and the second surface 37 of the transparent sheet 12 and collected by the 2D image generating device 22; a lens 20, between the first surface 31 of the transparent sheet and the 2D image generating device 22, with the lens 20 focusing light reflected from the first surface 35 and the second surface 37 of the transparent sheet 12 from the at least six discrete light sources 14 onto the 2D image generating device 22, and; a processor 24; wherein the processor 24 processes the output from the image generating device 22 to define a reflected image area 39 from the first surface 35 and the second surface 37 of the transparent sheet from the at least six discrete light sources 14, with the reflected image area 39 unique to the coating for the first surface 31 and the second surface 33 of the transparent sheet 12, and with the reflected image area 39 used to detect the presence of the coating on the first surface 31 or the second surface 33 of the transparent sheet 12.

The device 10 further comprising a slit aperture 18 between the at least six discrete light sources and the first surface 31 of the transparent sheet 12, with the slit aperture 18 limiting the apparent area of the at least six discrete light sources 14.

The device 10 further comprising a diffuser 16 between the at least six discrete light sources 14 and the slit aperture 18, with the diffuser 16 scattering light and eliminating structure from the at least six discrete light sources 14.

The device 10 wherein the at least six discrete light sources 14 are LEDs and have wavelengths from 350 nm to 1050 nm, covering the range from ultraviolet to infrared.

The device 10 wherein an exposure time and an electronic gain of the image generating device 22 are adjustable and there is no filter between the transparent sheet 12 and the image generating device 22.

The device 10 wherein the reflected image area 39 from the at least six discrete light sources 14 from the first surface 35 and the second surface 37 for a transparent sheet 12 without a reflective coating is normalized to the reflected image area 39 from one of the at least six discrete light sources 14 from the first surface 35 and the second surface 37 for the transparent sheet 12 without a reflective coating and wherein an output power of the at least six discrete light sources 14 is not calibrated and wherein a sensitivity of the 2D image generating device 22 is not calibrated.

A method for detecting a coating and determining a type of coating on a first surface 31 or a second surface 33 of a transparent sheet 12, measuring a thickness of the transparent sheet 12 and/or measuring a spacing between at least two transparent sheets 12, comprising: projecting light from at least three discrete light sources 14, each having a different narrow band emission; collecting light with a 2D image generating device 22, and producing an output from the 2D image generating device 22, with the at least three discrete light sources 14 disposed at an angle to the 2D image generating device 22 and on a same side of the transparent sheet 12, such that the light projected from the at least three discrete light sources 14 is reflected 35, 37 from the first surface 31 and the second surface 33 of the transparent sheet 12 and collected by the 2D image generating device 22; focusing light with a lens 20 between the first surface 31 of the transparent sheet and the 2D image generating device 22, with the lens 20 focusing light reflected from the first surface 35 and the second surface 37 of the transparent sheet 12 from the at least three discrete light sources 14 onto the 2D image generating device 22, and; processing the output from the 2D image generating device 22 with a processor 24 and defining a reflected image area 39 and a reflected image position 41 from the first surface 35 and the second surface 37 of the transparent sheet 12 from the at least three discrete light sources 14, defining a sparse spectrometer profile from the reflected image area 39 from the first surface 35 and the second surface 37 of the transparent sheet 12 from the at least three discrete light sources 14, detecting the coating and determining the type of coating, on either the first surface 31 or the second surface 33 of the transparent sheet 12 using the sparse spectrometer profile; calculating the thickness of the transparent sheet 12 and the spacing between the at least two transparent sheets 12 from a distance between the reflected image position 43 from the at least three discrete light sources 14 from the first surface 31 and the second surface 33 of the transparent sheet 12.

The method further comprising eliminating structure from the light projected from the at least three discrete light sources 14 with a slit aperture 18 between the at least three discrete light sources 14 and the first surface 31 of the transparent sheet 12.

The method further comprising scattering light from the at least three light sources 14 with a diffuser 16 between the at least three discrete light sources 14 and the slit aperture 18.

The method further comprising adjusting an exposure time and an electronic gain of the image generating device 22 and wherein there is no filter between the transparent sheet 12 and the image generating device 22.

The method further comprising normalizing the reflected image area 39 from the at least three discrete light sources 14 from the first surface 31 and the second surface 33 for a transparent sheet 12 without a reflective coating to the reflected image area 39 from one of the at least three discrete light sources 14 from the first surface 31 and the second surface 33 for the transparent sheet 12 without a reflective coating and not calibrating an output power of the at least three discrete light sources 14 and not calibrating a sensitivity of the 2D image generating device 22.

The method wherein the at least three discrete light sources 14 are LEDs.

The method wherein the at least three discrete light sources 14 are at least four, five, six, seven, eight, nine, ten or twenty discrete light sources 14.

The method wherein the at least two transparent sheets 12 is at least three transparent sheets 12.

The method wherein the at least three light sources 14 have wavelengths from 350 nm to 1050 nm, covering the range from ultraviolet to infrared.

FIG. 1 shows the device for detecting a coating on a first surface 31 or a second surface 33 of a transparent sheet 12, measuring a thickness of the transparent sheet 12 and measuring a spacing between at least two transparent sheets 12 comprising a light source array of at least three light sources 14 at a fixed angle to the transparent sheet 12, a 2D image sensor 22 also at a fixed angle to the transparent sheet media 12, a lens 20 attached to the 2D image sensor 22, and a processor 24 which controls the intensity of the individual at least three light sources 14 and captures images from the 2D image sensor 22. The light source array consists of multiple light sources 14 with a slit aperture 18 placed in front of each light source 14 in the direction of light output. LEDs can have internal structure to the light emitting element, which when imaged by the 2D image generating device 22 will cause incomplete or multiple images to occur for a single LED. A diffusing surface 16 can be placed between the at least three light sources 14 and slit aperture 18 to eliminate any structure to the light beam caused by the at least three light sources 14.

Figure 5:
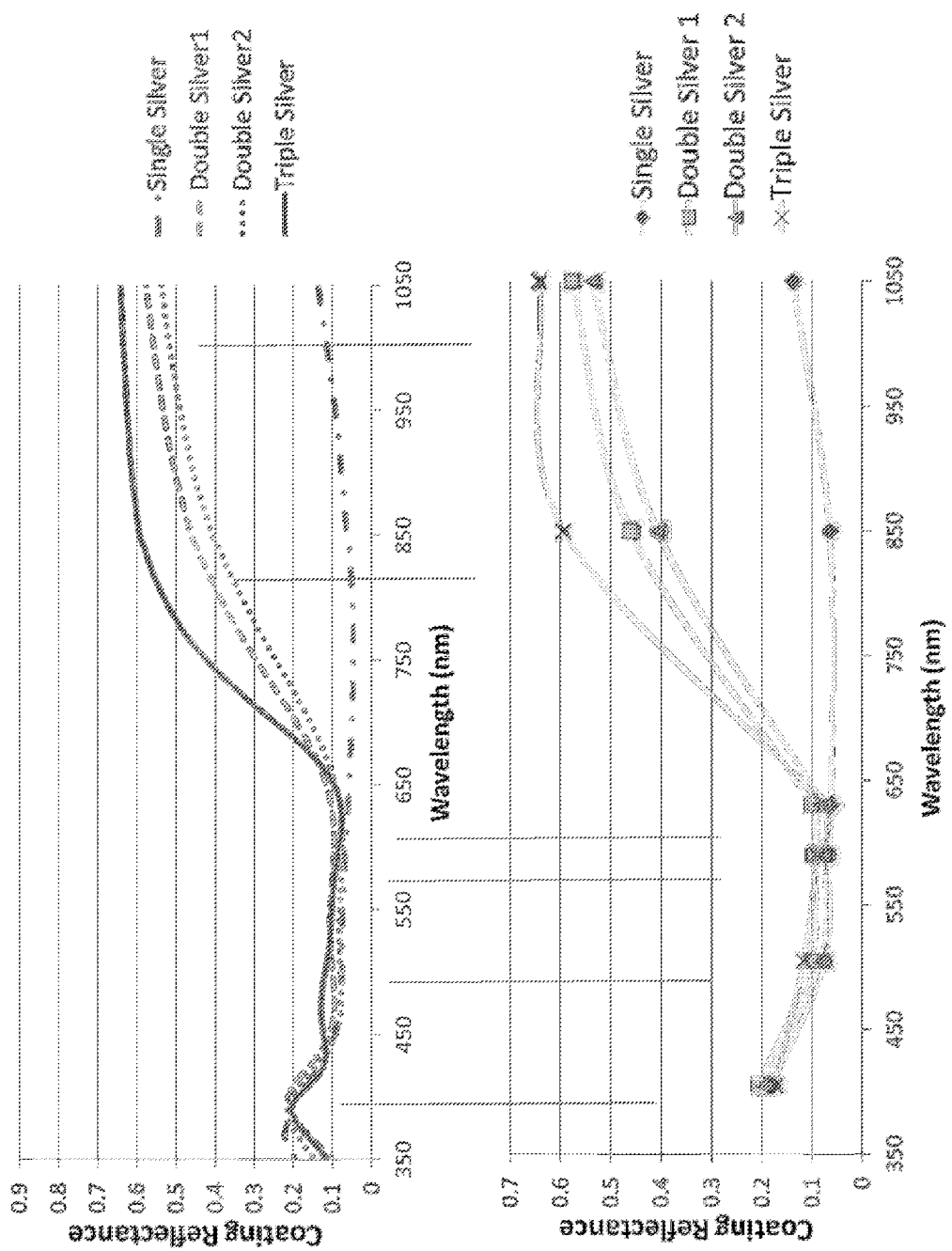
FIG. 5 of the drawings shows the sparse spectrometer profile obtained from the LowE reflectance profiles shown in FIG. 4.

Optionally, a temperature sensor 26 may be placed at or near the at least three light sources 14 and connected to the processor 24 to allow any temperature dependency of the at least three light sources 14 to be compensated by the processor 24. Light from the individual elements of the light source array 14 passes through the diffuser 16, is limited by the apertures 18, and reflects from each surface 31, 33 of the transparent media 12. This reflected light 35, 37 is collected by the camera lens 20 and imaged onto the 2D image generating device 22. The processor 24 captures the image from the 2D image generating device 22 and computes the reflected image position 41 from each light source 14 and the first surface 31 and second surface 33 of the transparent sheet 12. After computing the position of the reflected images 41, the processor 24 applies a calibration for thickness, parallax, and distortion. The corrected positions are used to determine the distance between the first surface 31 and the second surface 33 of the transparent medium 12. The processor 24 also uses the relative reflected image area 39 of the reflected images 35, 37 to create a sparse spectrometer profile, as shown in FIG. 5, of a coating which may be on the surface of the transparent sheet 12. The processor 24 compares the measured profile with known coating profiles to determine the surface coating. The processor 24 outputs information to an output display 28, including the presence and type of coating on a first surface 31 or second surface 33 of a transparent sheet 12 and the thickness of a transparent sheet 12 and the distance between at least two transparent sheets 12.

FIG. 2 shows the reflected images of three LEDs 14 from surface one 35 and reflected images of three LEDs 14 from surface two 37 as detected by the 2D image generating device 22. The three LEDs 14 are of three different wavelengths, for example, but not limited to 405 nm, 505 nm, 590 nm, 630 nm, 850 nm and 1050 nm. The reflected image areas 39 at the at least three different wavelengths are used to determine the type of coating on the transparent sheet 12. The figure shows a surface 35 which reflects more light from the third LED 35$c$ than from the first 35$a$ or second 35$b$ LED. This results in the reflected spot having a larger area 39. As a result of the higher reflectance of the third LED from surface 35, the corresponding reflection from the second surface 37 is reduced, resulting in a smaller spot area 37c. The reflections for the first and second LEDS (35a, 37a, 35b, and 37b) show equal reflectivity and thus equal spot areas from both surfaces.

Figure 3A:
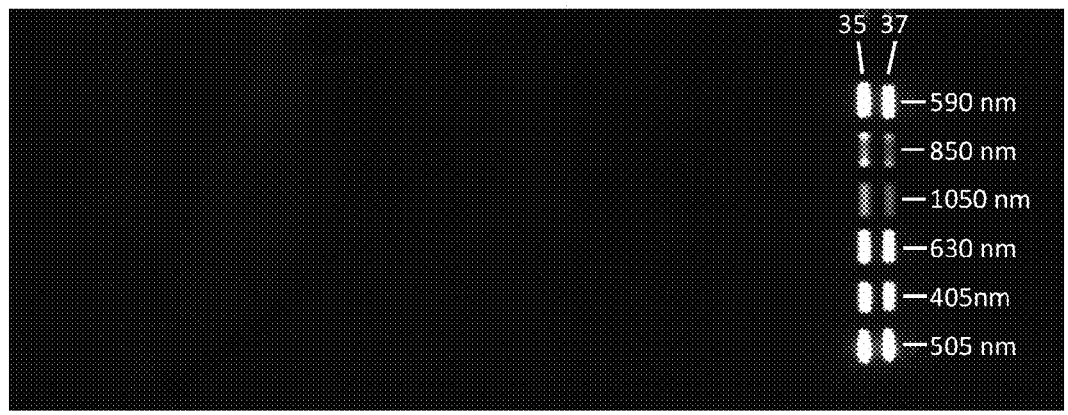
FIG. 3A through G of the drawings shows the reflected images of six LEDs from the first and second surfaces of transparent sheets in the absence of any coating or with various coatings applied.
Figure 3B:
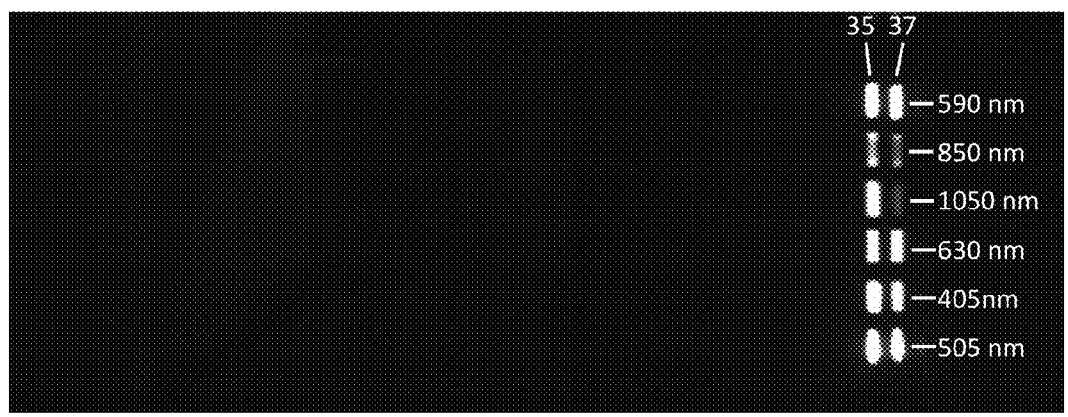
Figure 3C:
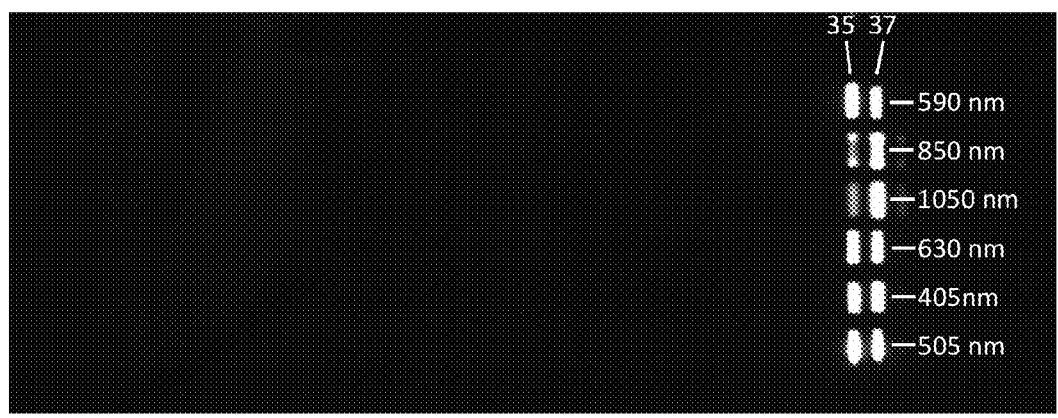
Figure 3D:
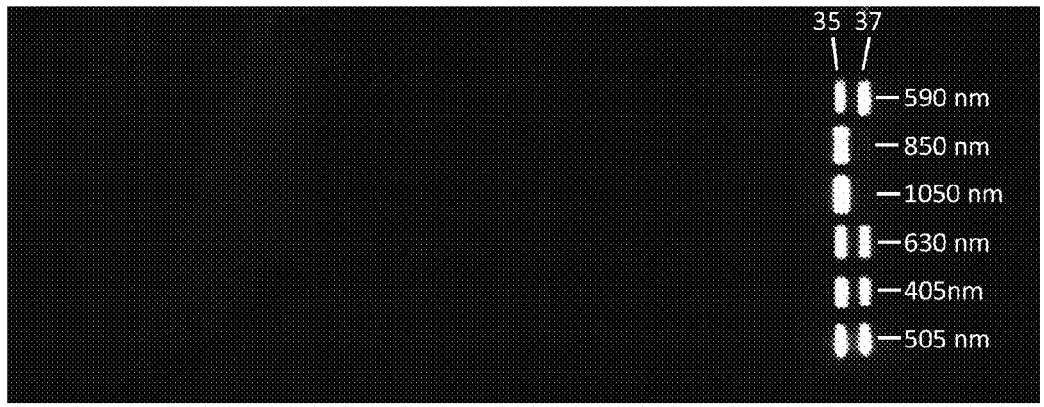
Figure 3E:
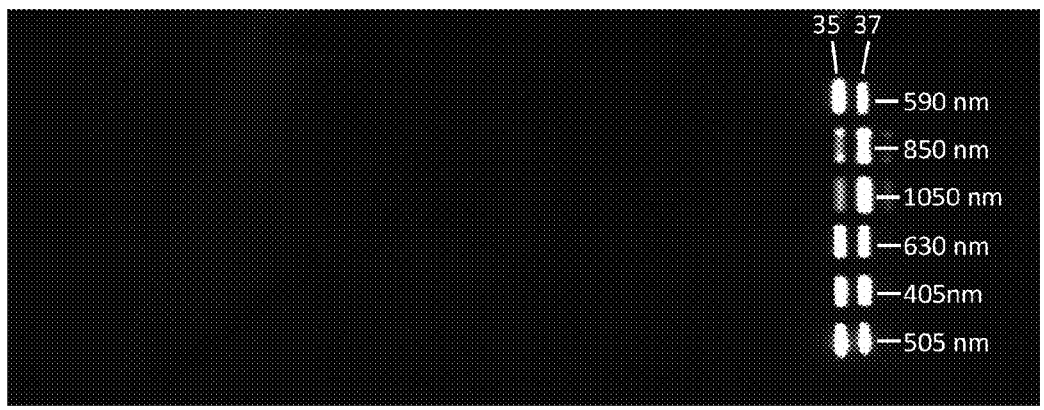
Figure 3F:
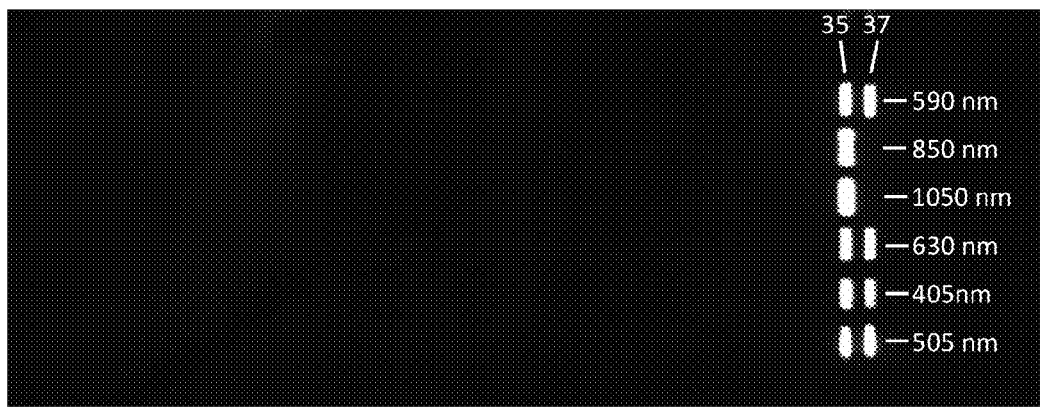
Figure 3G:
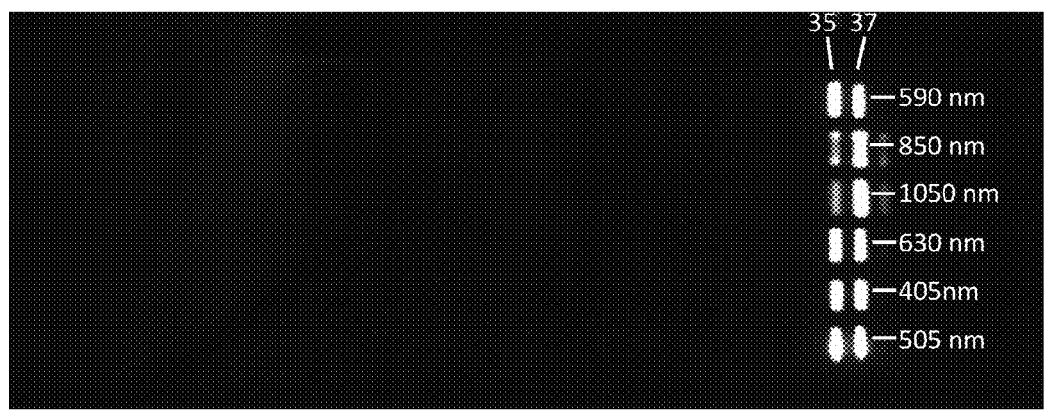

FIGS. 3A-3G show the reflected images 35, 37 of six LEDs from the first surface 31 of the transparent sheet 12 and the second surface 33 of transparent sheet 12 with various coatings applied. From the top to the bottom in FIGS. 3A-3G, the order of the reflection from the first surface 35 and the reflection from the second surface 37 is 590 nm, 850 nm, 1050 nm, 630 nm, 405 nm and 505 nm. FIG. 3A shows the reflected images from the first surface 35 and the second surface 37 from clear glass with no coating applied to either the first surface 31 or the second surface 33 of the transparent sheet 12. FIG. 3B shows the reflected images from the first surface 35 and the second surface 37 from a single silver lowE coating on the first surface 31 of the transparent sheet 12. FIG. 3C shows the reflected images from the first surface 35 and the second surface 37 from a single silver lowE coating on the second surface 33 of the transparent sheet 12. FIG. 3D shows the reflected images from the first surface 35 and the second surface 37 from a double silver lowE coating on the first surface 31 of the transparent sheet 12. FIG. 3E shows the reflected images from the first surface 35 and the second surface 37 from a double silver lowE coating on the second surface 33 of the transparent sheet 12. FIG. 3F shows the reflected images from the first surface 35 and the second surface 37 from a triple silver lowE coating on the first surface 31 of the transparent sheet 12. FIG. 3G shows the reflected images from the first surface 35 and the second surface 37 from a triple silver lowE coating on the second surface 33 of the transparent sheet.

Figure 4:
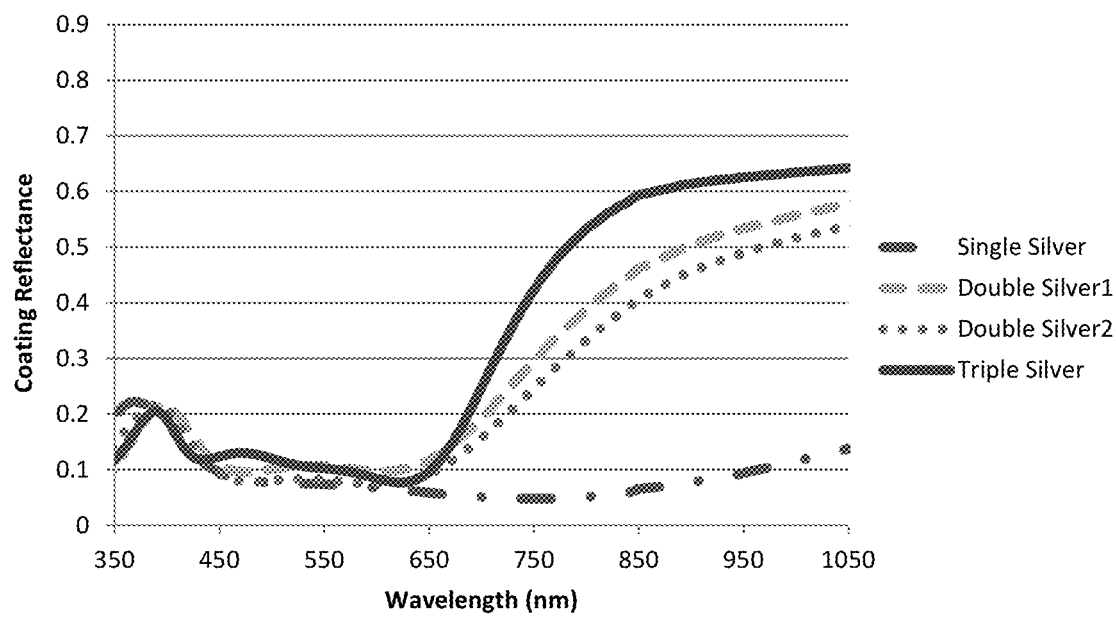
FIG. 4 of the drawings shows representative LowE reflectance profiles.

FIG. 4 shows a reflectance profile from 350 nm to 1050 nm for four typical lowE coatings: single silver, double silver1, double silver2 and triple silver.

FIG. 5 shows the sparse spectrometer profile at 450 nm, 590 nm, 630 nm, 850 nm and 1050 nm wavelengths for four typical lowE coatings: single silver, double silver1, double silver2 and triple silver.

FIG. 6 shows the reflected images from the first surface 35 and the second surface 37 from six light sources 14 from the first surface 31 and second surface 33 of two transparent sheets 12 comprising an insulated glass window.

FIG. 7 of the drawings shows the reflected images from the first surface 35 and the second surface 37 from six light sources 14 from the first surface 31 and second surface 33 of three transparent sheets 12 comprising an insulated glass window.

The preferred embodiment of the device 10 uses at least six discrete light sources 14 which are LEDs with wavelengths of 405 nm (near UV), 505 nm (blue), 590 nm (green), 630 nm (red), 850 nm and 1050 nm (near IR). The LED light sources 14 project light through slit apertures 18 and are arranged so they are parallel with one axis of the 2D image generating device (2D CMOS image sensor) 22, as shown in FIG. 1. The reflected images 35, 37 from the first surface 31 and the second surface 33 of the transparent sheet 12 produce images on the 2D image generating device 22 which appear oval in shape, as shown in FIGS. 2, 3, 6 and 7. The relative position of the imaged oval spots 35, 37 perpendicular to the axis of the at least six LEDs 14 relate to the first 31 and second surfaces 33 and coatings on the first and second surfaces 31, 33 of the transparent sheet 12. As shown in FIGS. 3A-3G, the order from top to bottom of the reflected images 35, 37 are spots of wavelengths 590 nm, 850 nm, 1050 nm, 630 nm, 405 nm and 505 nm.

The LEDs 14 are positioned vertically and the glass reflections 35a,b,c and 37a, b, c from each LED 14 are spaced horizontally, as shown in FIG. 2. Thickness is measured by processing the entire image to determine a reflected image position 41, then measuring the difference in position 43 between two or more reflected images 35 and 37 corresponding to the same LED light source 14. This measurement can be performed on the reflected image from multiple LEDs (e.g., 35a and 37a, 35b and 37b and 35c and 37c) and combined to produce a more accurate thickness measurement. This approach allows the thickness of multiple glass sheets 12 to be measured as well as the thickness of any airspace between the glass sheets 12, as in the case of an insulated glass unit (FIGS. 6, 7). Up to three pieces of glass (six surfaces) and two airspaces may be measured, as shown in FIG. 7.

As shown in FIGS. 3A-3G, the reflected spots from the first and second surfaces 35, 37 from the second and third LED positions from the top (850 nm and 1050 nm) correspond to two infrared LEDs 14. The infrared reflectance is an important part of determining whether the first or second surface 31, 33 of the transparent sheet 12 is coated with the infrared reflecting lowE coating. FIG. 3D shows where the first surface 31 has the IR reflecting coating and the second surface 33 does not have the IR reflecting coating because there is a reflected image from the first surface 35 of the transparent sheet 12 but no reflected image from the second surface 37 of the transparent sheet 12 for the IR LEDs. FIG. 3E shows where the second surface 33 of the transparent sheet 12 has the IR reflecting coating and the first surface 31 of the transparent sheet 12 does not have the IR reflecting coating because there is a reflected image from the second surface 37 of the transparent sheet 12 and a smaller reflected image from the first surface 35 of the transparent sheet 12 for the IR LEDs.

Most coatings used in the window glass industry have smooth reflection curves versus wavelength. FIG. 4 shows the reflectance profile of typical low E coatings with increasing wavelength: single silver, double silver1, double silver 2 and triple silver. The smooth curve allows an accurate reflectance profile of the coating to be measured with a sparse wavelength spectrometer, as shown in FIG. 5, bottom. By selecting the sparse wavelengths correctly for the coatings of interest (such as, but not limited to, wavelengths 590 nm, 850 nm, 1050 nm, 630 nm, 405 nm and 505 nm), the reflection sparse spectrometer profile can be measured for the first surface 31 and second surface 33 of a transparent sheet 12 and compared to the known coatings of interest. The reflection sparse spectrometer profile is measured by comparing the relative reflected image area 39 for each LED image from each of the first 35 and second surfaces 37 of the transparent sheet 12. The relative image area is obtained by first recording the image area produced by a reference transparent sheet 12, then normalizing all of the image areas 39 produced by different LEDs 14 to that produced by one LED 14, for example the 630 nm. By normalizing to a reference media 12 and to one of the multiple LEDs 14 it is not necessary to accurately calibrate the output power of the LEDs 14 or the sensitivity of the 2D image sensor 22. The normalized image area for each LED 14 can then be compared to an externally determined coating profile. By comparing this measured profile with known coating profiles, the device 10 can function as a coating discriminator, detecting the presence of various different coatings. The measured profile can also be used to detect colored, heat absorbing, or UV absorbing glass, and to detect coatings on colored, heat absorbing, or UV absorbing glass.

The use of a 2D image generating device 22 allows simultaneous capture of the multiple triangulation paths at relatively high speeds (30 frames per second or greater) while simultaneously performing as a sparse wavelength spectrometer.

The device 10 may be installed on an IG production line where transparent sheets 12 are moved with a conveyance system.

The system requires several calibration steps. First, the LED intensity must be set for each LED color of the at least three light sources 14 so that the reflected image area 39 is similar for reflections from the first surface 35 and the second surface 37 of the transparent sheet 12. Second, the reflected image position 41 in the camera image must be calibrated to an actual glass position relative to the device 10 to compensate for parallax effects and lens distortion. Currently this is done by moving a piece of glass 12 vertically through the measurement range 30 and recording the reflected image positions 41 and known heights. The calibration of the device 10 includes moving a transparent sheet 12 through a measurement range 30 of the device 10 and recording the reflected image position 41 and a distance between the transparent sheet 12 and the image generating device 22. These known positions are then used to generate a polynomial fit which produces a height in millimeters versus position of the reflected images 41 on the 2D image sensor 22 calibration. A second linear fit is used to correct for the increase in area of the LED images 35, 37 when they are closer to the camera 22. A third linear fit is used to correct for changes in an image position 41 corresponding to a single LED 14 versus height due to camera lens distortion. Lastly, the measured thicknesses must be corrected when the thickness is through glass rather than air due to the refractive bending of the light through the glass which increases the spacing of the reflected spots 43 in the camera image.

The foregoing discussion discloses and describes merely exemplary embodiments of the present invention. Upon review of the specification, one skilled in the art will readily recognize from such discussion, and from the accompanying drawings and claims, that various changes, modifications and variations can be made therein without departing from the spirit and scope of the invention as defined in the following claims.

What is claimed is:

1. A device for detecting a coating and determining a type of coating on a first surface or a second surface of a transparent sheet, measuring a thickness of the transparent sheet and/or measuring a spacing between at least two transparent sheets, comprising:
    at least three discrete light sources, each having a different narrow band emission;
    a 2D image generating device, producing an output, with the at least three discrete light sources disposed at an angle to the 2D image generating device and on a same side of the transparent sheet, such that light projected from the at least three discrete light sources is reflected from the first surface and the second surface of the transparent sheet and collected by the 2D image generating device;
    a lens between the first surface of the transparent sheet and the 2D image generating device, with the lens focusing light reflected from the first surface and the second surface of the transparent sheet from the at least three discrete light sources onto the 2D image generating device, and;
    a processor;
    wherein the processor processes the output from the 2D image generating device to define a reflected image area and a reflected image position from the first surface and the second surface of the transparent sheet from the at least three discrete light sources,
    wherein the reflected image area from the first surface and the second surface of the transparent sheet from each of the at least three discrete light sources comprises a sparse spectrometer profile used to detect the coating and to determine the type of coating, on either the first surface or the second surface of the transparent sheet, and
    wherein a distance between the reflected image position from the at least three discrete light sources from the first surface and the second surface of the transparent sheet is used to calculate the thickness of the transparent sheet and the spacing between the at least two transparent sheets.

2. The device according to claim 1, further comprising a slit aperture between the at least three discrete light sources and the first surface of the transparent sheet.

3. The device according to claim 2, further comprising a diffuser between the at least three discrete light sources and the slit aperture, with the diffuser scattering light and eliminating structure from the light projected from the at least three light sources.

4. The device according to claim 1, wherein the at least three discrete light sources are LEDs.

5. The device according to claim 1, wherein the at least three discrete light sources are at least four discrete light sources or at least five discrete light sources or at least six discrete light sources or at least seven discrete light sources or at least eight discrete light sources or at least nine discrete light sources or at least ten discrete light sources or at least twenty discrete light sources.

6. The device according to claim 1, wherein an exposure time and an electronic gain of the image generating device are adjustable and there is no filter between the transparent sheet and the image generating device.

7. The device according to claim 1, wherein the at least two transparent sheets is at least three transparent sheets.

8. The device according to claim 1, wherein the at least three light sources have wavelengths from 350 nm to 1050 nm, covering the range from ultraviolet to infrared.

9. The device according to claim 1, wherein the at least three light sources have wavelengths from 600 nm to 2000 nm, covering the infrared range.

10. The device according to claim 1, wherein the reflected image area from the at least three discrete light sources from the first surface and the second surface of the transparent sheet are normalized to the reflected image area from one of the at least three discrete light sources from the first surface and the second surface of the transparent sheet, and wherein an output power of the at least three discrete light sources is not calibrated and wherein a sensitivity of the 2D image generating device is not calibrated.

11. A device for detecting a coating on a first surface or a second surface of a transparent sheet, comprising:
    at least six discrete light sources, each having a different narrow band emission;
    a 2D image generating device, producing an output, with the at least six discrete light sources disposed at an angle to the 2D image generating device and on a same side of the transparent sheet, such that light projected from the at least six discrete light sources is reflected from the first surface and the second surface of the transparent sheet and collected by the 2D image generating device;
    a lens, between the first surface of the transparent sheet and the 2D image generating device, with the lens focusing light reflected from the first surface and the second surface of the transparent sheet from the at least six discrete light sources onto the 2D image generating device, and;
a processor;
wherein the processor processes the output from the image generating device to define a reflected image area from the first surface and the second surface of the transparent sheet from the at least six discrete light sources, with the reflected image area unique to the coating for the first surface and the second surface of the transparent sheet, and with the reflected image area used to detect the presence of the coating on the first surface or the second surface of the transparent sheet.

12. The device according to claim 11, further comprising a slit aperture between the at least six discrete light sources and the first surface of the transparent sheet and comprising a diffuser between the at least six discrete light sources and the slit aperture, with the diffuser scattering light and eliminating structure from the at least six discrete light sources.

13. The device according to claim 11, wherein the at least six discrete light sources are LEDs and have wavelengths from 350 nm to 1050 nm, covering the range from ultraviolet to infrared or have wavelengths from 600 nm to 2000 nm, covering the infrared range.

14. The device according to claim 11, wherein an exposure time and an electronic gain of the image generating device are adjustable and there is no filter between the transparent sheet and the image generating device.

15. The device according to claim 11, wherein the reflected image area from the at least six discrete light sources from the first surface and the second surface for a transparent sheet without a reflective coating is normalized to the reflected image area from one of the at least six discrete light sources from the first surface and the second surface of the transparent sheet without a reflective coating and wherein an output power of the at least six discrete light sources is not calibrated and wherein a sensitivity of the 2D image generating device is not calibrated.

16. A method for detecting a coating and determining a type of coating on a first surface or a second surface of a transparent sheet, measuring a thickness of the transparent sheet and/or measuring a spacing between at least two transparent sheets, comprising:
projecting light from at least three discrete light sources, each having a different narrow band emission;
collecting light with a 2D image generating device, and producing an output from the 2D image generating device, with the at least three discrete light sources disposed at an angle to the 2D image generating device and on a same side of the transparent sheet, such that the light projected from the at least three discrete light sources is reflected from the first surface and the second surface of the transparent sheet and collected by the 2D image generating device;
focusing light with a lens between the first surface of the transparent sheet and the 2D image generating device, with the lens focusing light reflected from the first surface and the second surface of the transparent sheet from the at least three discrete light sources onto the 2D image generating device, and;
processing the output from the 2D image generating device with a processor and defining a reflected image area and a reflected image position from the first surface and the second surface of the transparent sheet from the at least three discrete light sources,
defining a sparse spectrometer profile from the reflected image area from the first surface and the second surface of the transparent sheet from the at least three discrete light sources,
detecting the coating and determining the type of coating, on either the first surface or the second surface of the transparent sheet using the
sparse spectrometer profile;
calculating the thickness of the transparent sheet and the spacing between the at least two transparent sheets from a distance between the reflected image position from the at least three discrete light sources from the first surface and the second surface of the transparent sheet.

17. The method according to claim 16, further comprising limiting the apparent area of the at least three discrete light sources with a slit aperture between the at least three discrete light sources and the first surface of the transparent sheet.

18. The method according to claim 17, further comprising eliminating structure from the light projected from the at least three light sources with a diffuser between the at least three discrete light sources and the slit aperture.

19. The method according to claim 16, further comprising adjusting an exposure time and an electronic gain of the image generating device and wherein there is no filter between the transparent sheet and the image generating device.

20. The method according to claim 16, further comprising normalizing the reflected image area from the at least three discrete light sources from the first surface and the second surface for a transparent sheet without a reflective coating to the reflected image area from one of the at least three discrete light sources from the first surface and the second surface for the transparent sheet without a reflective coating and not calibrating an output power of the at least three discrete light sources and not calibrating a sensitivity of the 2D image generating device.

* * * * *